(12) United States Patent
Ross et al.

(10) Patent No.: US 12,703,997 B2
(45) Date of Patent: Aug. 11, 2026

(54) LOCKSET STATUS INDICATOR

(71) Applicant: Schlage Lock Company LLC, Carmel, IN (US)

(72) Inventors: Mark A. Ross, Denver, CO (US); Zachary P. Boomer, Indianapolis, IN (US)

(73) Assignee: Schlage Lock Company LLC, Carmel, IN (US)

( * ) Notice: Subject to any disclaimer, the term of this patent is extended or adjusted under 35 U.S.C. 154(b) by 97 days.

(21) Appl. No.: 18/671,470

(22) Filed: May 22, 2024

(65) Prior Publication Data

US 2025/0361747 A1 Nov. 27, 2025

(51) Int. Cl.

*E05B 41/00* (2006.01)
*E05B 17/10* (2006.01)
*F21V 8/00* (2006.01)

(52) U.S. Cl.

CPC .............. *E05B 41/00* (2013.01); *E05B 17/10* (2013.01); *G02B 6/0008* (2013.01)

(58) Field of Classification Search

CPC ....... E05B 41/00; E05B 17/10; G02B 6/0008; Y10T 70/8027; Y10T 70/8081; Y10T 70/827
USPC .................................. 70/129, 432, 434, 441
See application file for complete search history.

(56) References Cited

U.S. PATENT DOCUMENTS

| | | | | |
|---|---|---|---|---|
| 2,308,844 | A * | 1/1943 | Wilshusen | B60Q 1/2669 362/540 |
| 10,233,670 | B2 * | 3/2019 | Shintani | E05B 41/00 |
| 2003/0031025 | A1 * | 2/2003 | Huizenga | B60Q 1/2669 362/85 |
| 2010/0020558 | A1 * | 1/2010 | Goto | E05B 85/14 362/487 |
| 2010/0321946 | A1 * | 12/2010 | Dingman | B60Q 3/258 362/501 |

FOREIGN PATENT DOCUMENTS

WO WO-2012039187 A1 * 3/2012 ........... E05B 17/106

* cited by examiner

*Primary Examiner* — Suzanne L Barrett
(74) *Attorney, Agent, or Firm* — Taft Stettinius & Hollister LLP

(57) ABSTRACT

A thumb turn assembly that is configured to provide an illuminated visual indication of an orientation of a thumb turn, and thus an illuminated indication of an active status relating lockset relating to an associated bolt being in a locked or unlocked position. The thumb turn assembly can include an optical system that can be coupled to the thumb turn body. At least a portion of the optical system can be displaced with the displacement of the thumb turn body. The optical system can be configured to transmit an illumination from or through the thumb turn body to visually communicate the indication of the orientation of the thumb turn, and thus the locked or unlocked position of the bolt.

22 Claims, 11 Drawing Sheets

LOCKSET STATUS INDICATOR

TECHNICAL FIELD

The present disclosure generally relates to lockset, and more particularly, but not exclusively, to providing an illuminated visual indication of a lockset status that is identifiable in at least low-light conditions.

BACKGROUND

Locksets can assist with controlling access to, or passage through, an opening. For example, locksets can assist in controlling whether an associated door can, or can not, be opened. An example of such lockset assemblies are deadbolt locks. With deadbolt locks, when the door to which the deadbolt lock is attached is in a closed position, a deadbolt of the deadbolt lock can be displaced to an extended position in which at least a portion of the deadbolt is positioned an opening in an adjacent door jamb. With respect to at least certain types of locksets, with the deadbolt in the extended position, the lockset can be locked so as to prevent the deadbolt from being displaced to a retracted position at which the deadbolt does not extend into the door jamb. Thus, the door can be locked in a closed position relative to the door jamb by the deadbolt being selectively extended into the opening in the door jamb.

SUMMARY

The present disclosure may comprise one or more of the following features and combinations thereof.

In one embodiment of the present disclosure, a thumb turn assembly is provided for a trim assembly having a lockset. The thumb turn assembly can include a thumb turn body that can be configured for a displacement between a first orientation and a second orientation, the first orientation associated with a bolt of the lockset being in an unlocked position, the second orientation associated with the bolt being in a locked position. The thumb turn assembly can also include an optical system that can be coupled to the thumb turn body. At least a portion of the optical system can be displaced with the displacement of the thumb turn body. Further, the optical system can be configured to transmit an illumination from or through the thumb turn body to visually communicate an illuminated indication of at least the thumb turn body being in at least one of the first orientation and the second orientation.

In another embodiment, an assembly is provided that can include a lockset having a bolt that is displaceable between a locked position and an unlocked position. The assembly can further include a thumb turn body that can be coupled to the bolt. The thumb turn body can be at a first orientation when the bolt is at the unlocked position, and at a second orientation when the bolt is at the locked position, the first orientation being different than the second orientation. The assembly can also include an optical system that can be coupled to the thumb turn body. The optical system can include a light diffuser and a light pipe, the light diffuser and the light pipe being coupled to, and rotatably displaceable with, the thumb turn body. Further, the optical system can be configured to transmit an illumination that visually indicates the thumb turn body being in at least one of the first orientation and the second orientation.

In an additional embodiment, a system can provide a visual indication of a bolt of a lockset being in either an unlocked position or a locked position. The system can include a thumb turn assembly comprising a thumb turn and an optical system. The thumb turn can be displaceable between a first orientation and a second orientation, the first orientation being indicative of the bolt being in the unlocked position, the second orientation being indicative of the bolt being in the locked position. The optical system can include at least one illumination source. The thumb turn assembly can be configured for a transmission of a light emitted by the illumination source from or through the thumb turn in a manner that visually distinguishes: (a) the thumb turn being in the first orientation from being in the second orientation, and/or (b) the thumb turn being in the second orientation from being in the first orientation. The system can also include at least one processor; and a memory coupled with the processor. The memory can include instructions that when executed by the processor cause the processor to generate one or more signals to facilitate an activation of at least a portion the at least one illumination source, and generate one or more signals to facilitate a deactivation of at least the portion of the at least one illumination source.

These and other features of the present disclosure will become more apparent from the following description of the illustrative embodiments.

BRIEF DESCRIPTION OF THE FIGURES

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 10 illustrates a perspective cross sectional view of the exemplary thumb turn body taken along line B-B in FIG. 8.

Corresponding reference numerals are used to indicate corresponding parts throughout the several views.

DETAILED DESCRIPTION OF THE ILLUSTRATIVE EMBODIMENTS

Figure 1:
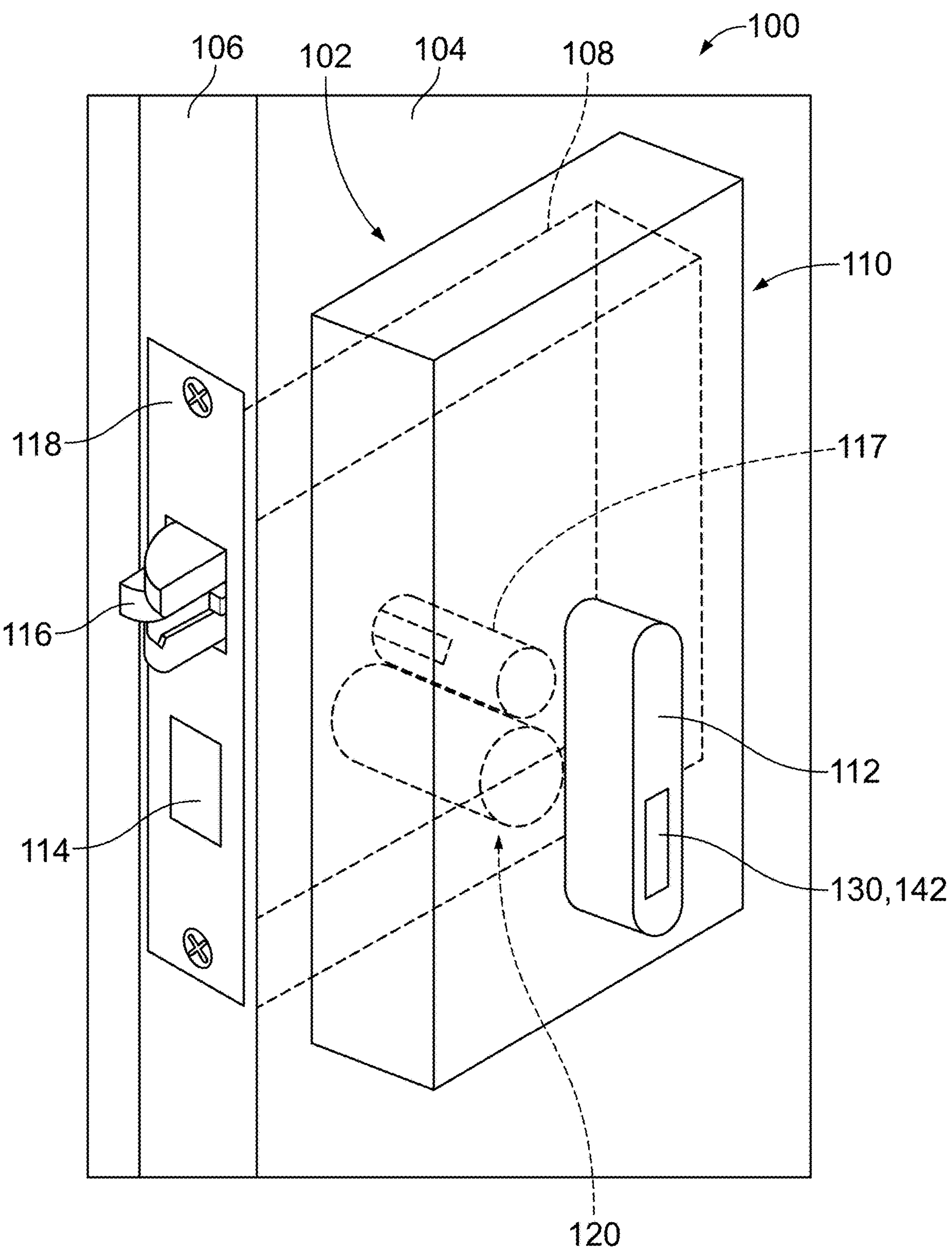
FIG. 1 illustrates a closure assembly with, or coupled to, an exemplary lockset according to an illustrated embodiment.

The following Detailed Description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the Detailed Description is not meant to limit the embodiments described below.

In the Detailed Description herein, references to "one embodiment", an "embodiment", and "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in art to affect such feature, structure, or characteristic in connection with other embodiments whether or not explicitly described.

Embodiments of the subject disclosure provide a system and method for enabling an individual, including an end user, to visually attain a security status of a lockset from a distance away from the lockset, regardless of ambient light levels. As discussed below, visual recognition of the current or active status of the lockset is facilitated via an embedding an optical system into a trim assembly, which can in include an interior trim, of the lockset that can be selectively illuminated, including on a periodic function. The optical system can provide an illumination user interface (UI) that can indicate the active status of the lockset, and more specifically, visually indicate a secure or unsecured status of the lockset, including in low-light conditions. The inclusion of such an optical system to at least the trim assembly of the lockset can minimize, if not eliminate, the user from having to take a secondary action, such as, for example, activating an overhead room light, in determining the active status of the lockset in at least low-light conditions.

According to certain embodiments, including, for example, those in which a supply of electrical power is not, or is less of, a concern, the optical system can be configured to be generally in a continuous illumination mode, or otherwise set for continuous illumination of extended durations. Alternatively, according to other embodiments, such as, for example, embodiments in which at least operation of the optical system, if not other portions of the lockset, are battery-powered, the lockset can be configured for selective illumination so as to at least attempt to reduce power, including battery, consumption. For example, according to such embodiments, illumination of the optical system can be selectively triggered by detection, including, for example, by one or more sensors, of relatively low ambient light conditions. Additionally, or alternatively, illumination of the optical system can be selectively activated by a user defined schedule, time schedule, or other schedule or predictions regarding anticipated periods of low ambient light conditions and/or based on potential user activity/inactivity.

FIG. 1 illustrates a closure assembly 100 that includes, or is coupled to, an exemplary lockset 102 according to an illustrated embodiment. The closure assembly 100 includes a door 104, and can further include the lockset 102. The door 104 includes a free edge 106 and a door cutout 108 that extends from the free edge 106, and in which at least a portion of the lockset 102 is seated. The cutout 108 can have a variety of shapes and configurations. For example, according to certain embodiments, the cutout 108 can include a cross bore in the door 104, among other types of door preparations. The door 104 can be pivotally mounted to a frame (not shown) for swinging movement between an open position in which the free edge 106 is offset from a side jamb (not shown), and a fully-closed position in which the free edge 106 is aligned with the side jamb.

Figures 2, 3:
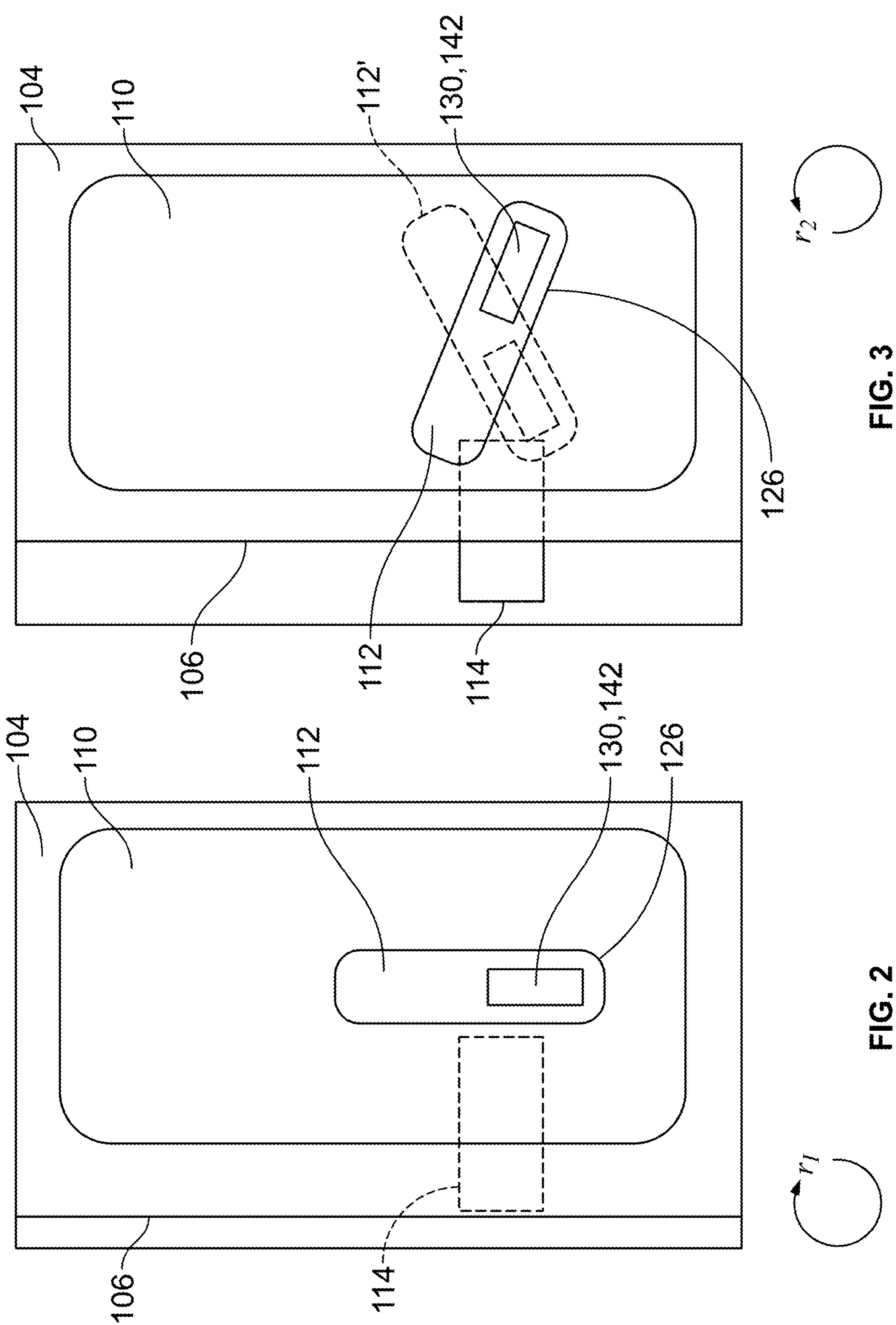
FIG. 2 illustrates an exemplary thumb turn and deadbolt, each being shown at their respective unlocked position or orientation.
FIG. 3 illustrates the thumb turn and associated of a deadbolt shown in FIG. 2, each being shown at their respective locked position or orientation.

In the illustrated embodiment, the lockset 102 is part of a trim assembly 110 that is mountable to a face of the door 104. The lockset 102 can also include a lock cylinder 117 and a faceplate 118, the faceplate 118 being configured to be secured to the free edge 106 of the door 104. The lockset 102 includes a thumb turn 112, and can optionally include a handle (not shown). Additionally, the lockset 102 can include a deadbolt 114, and, optionally, a latch bolt 116. Each of the deadbolt 114 and the latch bolt 116 can be independently movable from a retracted or unlocked position to an extended or locked position at which the in which the deadbolt 114 and/or the latch bolt 116 projects beyond the faceplate 118 and is operable to engage a strike box (not shown). For example, with respect to the deadbolt 114, FIGS. 1 and 2 illustrate an example of a deadbolt 114 being at the retracted or unlocked position, wherein the deadbolt 114 generally does not outwardly extend from the faceplate 118, and thus the deadbolt 114 is positioned at least primarily within the door 104, including, for example, in the cutout 108. Further, FIG. 3 illustrates an example of the deadbolt 114 being at an extended or locked position, wherein the deadbolt 114 outwardly extends away from at least the free edge 106 and/or faceplate 118 of the door 104. The latch bolt 116 can be biased toward its extended position, as illustrated in FIG. 1.

The lockset 102 further includes a transmission assembly 120 that is operatively connected with the deadbolt 114 and/or the latch bolt 116. More specifically, the transmission assembly 120 can drivingly connect an actuator 122 (FIG. 18), such as, for example, the thumb turn 112, handle, and/or motor, among other actuators, to the deadbolt 114 and/or the latch bolt 116. For example, the transmission assembly 120 can couple the thumb turn 112 to the deadbolt 114 such that manual or powered rotational displacement of the thumb turn 112 can directly or indirectly drive, or otherwise be associated with, displacement of the deadbolt 114 between the extended/locked position and the retracted/unlocked position. In one embodiment, the actuator 122 includes a motor that can also be utilized to drive the displacement of the deadbolt 114 between its extended/locked and retracted/unlocked positions, which can also coincide with the transmission also displacing, such as rotationally, the thumb turn 112 to a position associated with the deadbolt 114 being in either the extended/locked position or the retracted/unlocked position.

Figure 13:
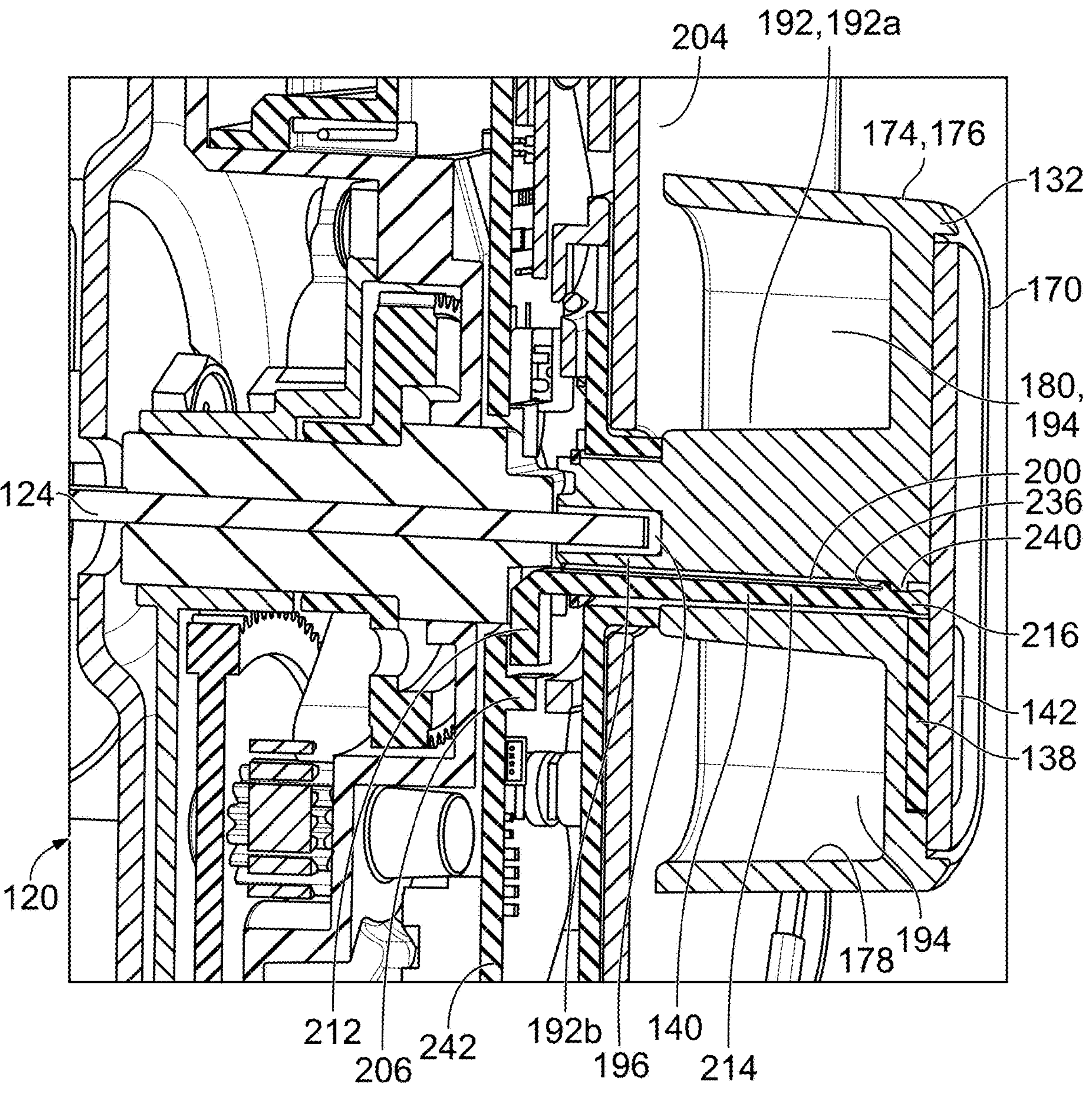
FIG. 13 illustrates a cross sectional view of a portion of an exemplary lockset having the thumb turn assembly shown in FIG. 4.
Figure 18:
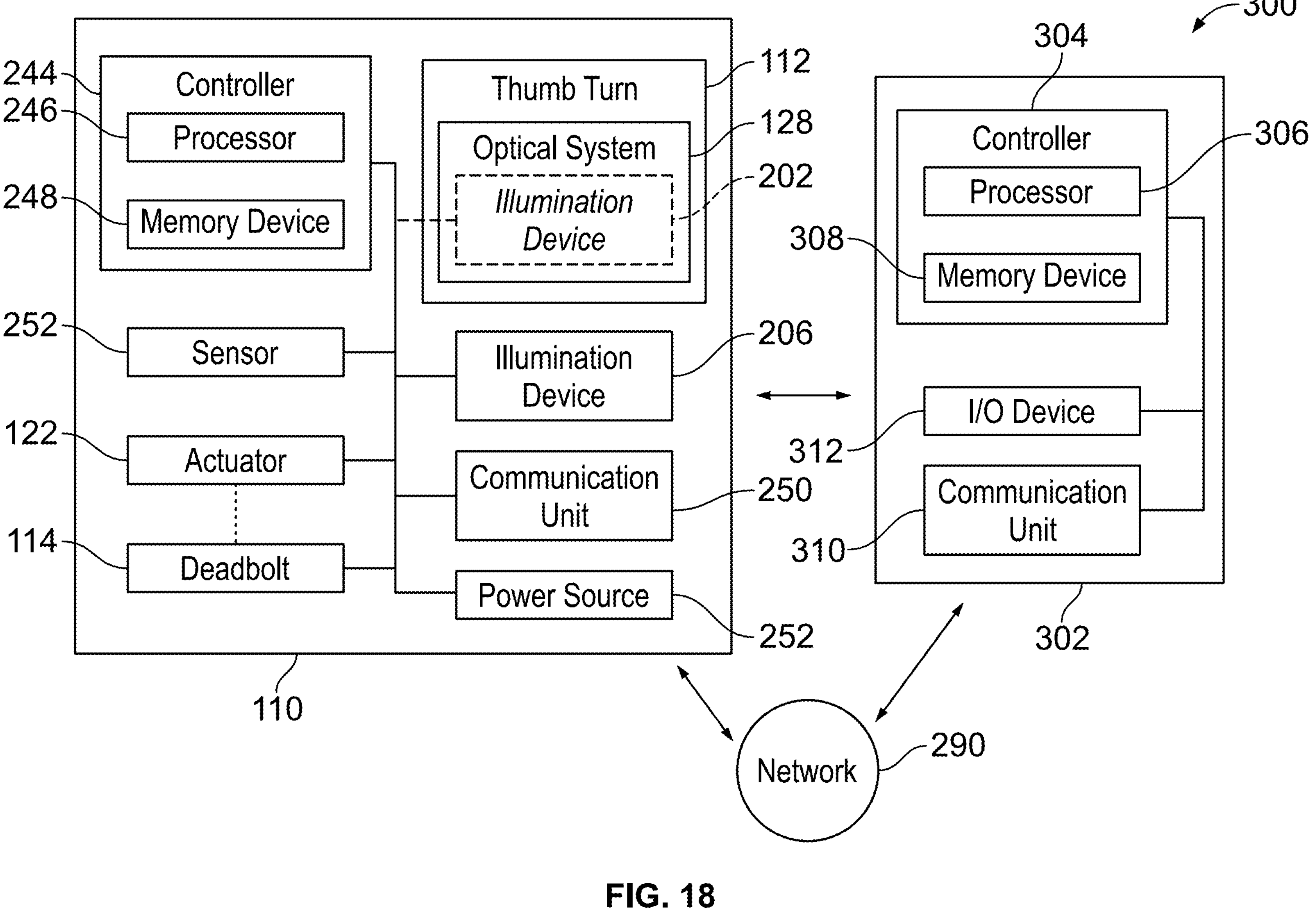
FIG. 18 illustrates a block diagram of a simplified representation of a system that includes a trim assembly that includes a lockset having a thumb turn assembly that includes an optical system that can be selectively illuminated via at least settings and/or commands communicated by a computing device.

Referencing FIGS. 13 and 18, according to certain embodiments, the transmission assembly 120 may include a drive shaft 124 that is coupled, either directly or indirectly, to the thumb turn 112 and the deadbolt 114. According to such an embodiment, a rotational displacement of the thumb turn 112 can be transmitted via the drive shaft 124 to one or more components of the transmission assembly 120 in a manner that can facilitate a linear displacement of the deadbolt 114 to the extended/locked position or the retracted/unlocked position. Additionally, the transmission assembly 120 can be configured such that operation of the actuator 122, such as, for example, an electric motor, generates a force that is transmitted, such as, for example, via the drive shaft 124, to both linearly displace the deadbolt 114 between the extended/locked position and the retracted/unlocked positions, as well as to rotatably displace the thumb turn 112 between an associated first, or unlocked orientation and a second, or locked orientation.

FIGS. 2 and 3 illustrate examples of a position of the exemplary thumb turn 112 in a first, retracted/unlocked orientation or position and a second, extended/locked orientation or position, respectively. As generally indicated by FIGS. 1 and 2, with the thumb turn 112 in the unlocked orientation, the deadbolt 114 is at the retracted position such that the deadbolt 114 does not extend beyond the free edge 106 of the door 104. With the thumb turn 112 in the unlocked orientation, the thumb turn 112 can be rotated in a first direction (as generally indicated by "$r_1$" FIG. 2) via either a manual force to displace the deadbolt 114 to the extended position (FIG. 3), or automatically in connection with an operation of the actuator 122 of the transmission assembly 120 providing a force to displace the deadbolt 114 to the extended position. Similarly, as generally indicated by FIG. 3, with the thumb turn 112 in the locked orientation, the deadbolt 114 is at the extended/locked position such that the deadbolt 114 extends beyond the free edge 106 of the door 102. With the thumb turn 112 in the locked orientation, the thumb turn 112 can be rotated in a second direction (as generally indicated by "$r_2$" in FIG. 3) via either a manual force to displace the deadbolt 114 to the retracted position (FIG. 2), or automatically in connection with an operation of the actuator 122 of the transmission assembly 120 providing a force to displace the deadbolt 114 to the extended/locked position.

The ability of an individual to visually identify the current rotational orientation of the thumb turn 112, such as whether the thumb turn 112 is currently at the retracted/unlocked orientation (FIG. 2) or the extended/locked orientation (FIG. 3), and thus identify whether the locket 102, including deadbolt 114, is in the corresponding locked or unlocked status or position, can, at least in certain instances, be influenced by associated ambient light levels. Moreover, at relatively higher ambient light levels, such as, for example, in daylight conditions, an end user may be able to identify the rotational orientation of the thumb turn 112 based on visual recognition of an outer profile of the thumb turn 112 from a greater distance away from the thumb turn 112 than may be possible during low ambient light level conditions. Indeed, at certain low ambient light level conditions, including at certain nighttime conditions, the end user may be unable to visually identify the rotational orientation of the thumb turn 112 based on identification of the outer profile of the thumb turn 112, regardless of how near or far the end user is from the thumb turn 112. However, as discussed below, embodiments of the subject disclosure provide for a locket 102 having a thumb turn assembly 126 that provides an illumination user interface 130 on the thumb turn 112 that can selectively visually indicate the active status of the lockset (e.g., locked or unlocked) in a variety of ambient light conditions.

Figure 4:
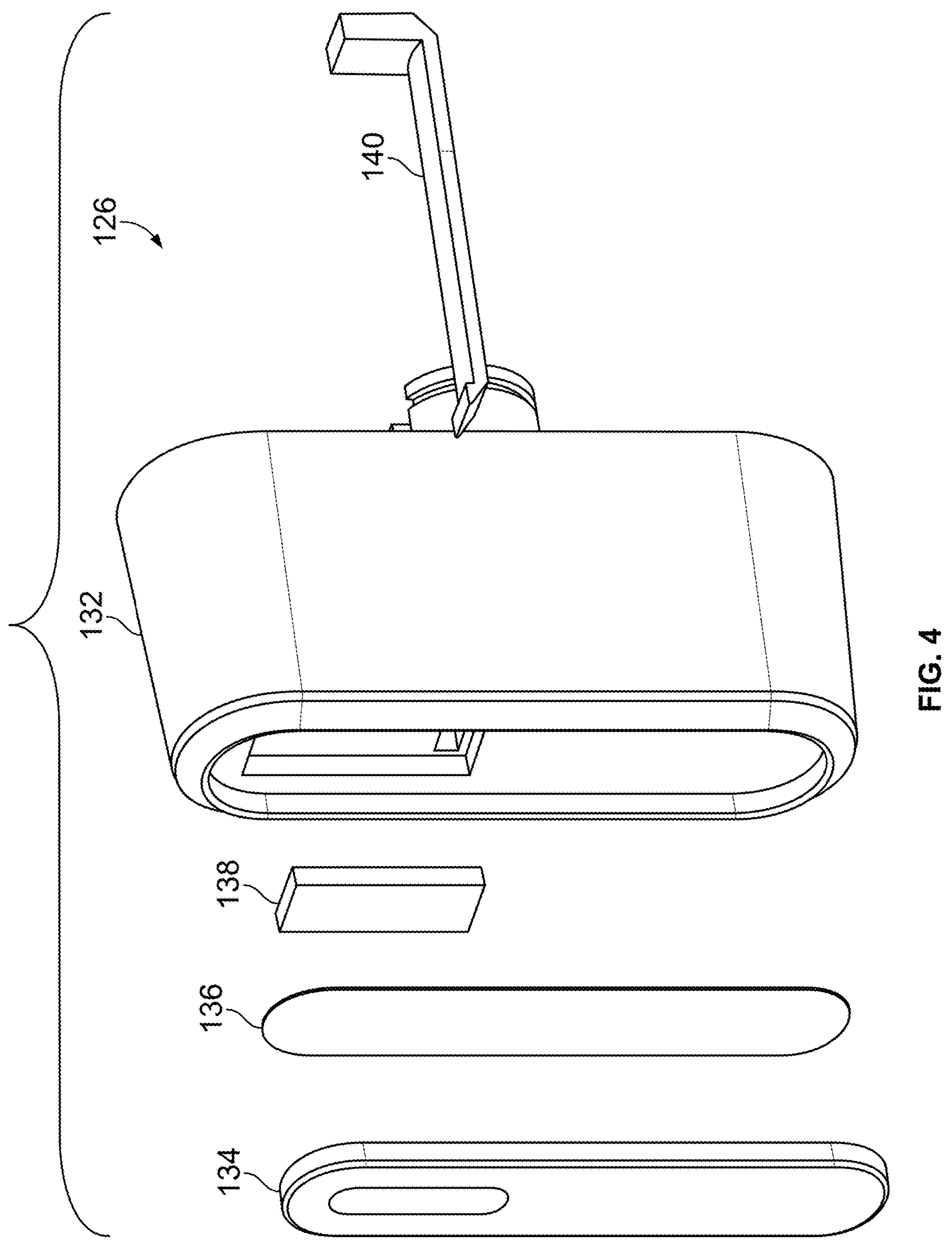
FIG. 4 illustrates an exploded view of an exemplary thumb turn assembly having an optical system that provides an illumination user interface according to an illustrative embodiment of the subject disclosure.

FIG. 4 illustrates an exploded view of an exemplary thumb turn assembly 126 of the lockset 102 that includes an optical system 128 (FIG. 18) that provides an illumination user interface 130 according to an illustrative embodiment of the subject disclosure. As seen, the thumb turn assembly 126 can include a thumb turn body 132 and a cover plate 134. FIG. 4 also illustrates an adhesive 136 as an exemplary manner of affixing the cover plate 134 to the thumb turn body 132. The optical system 128 can, according to certain embodiments, include a light diffuser 138 and a light pipe 140. Further, as discussed below, according to certain embodiments, the optical system 128 can further include a viewing window 142 that can be provided by, extend through, or be embedded in the cover plate 134.

Figures 5, 6, 7:
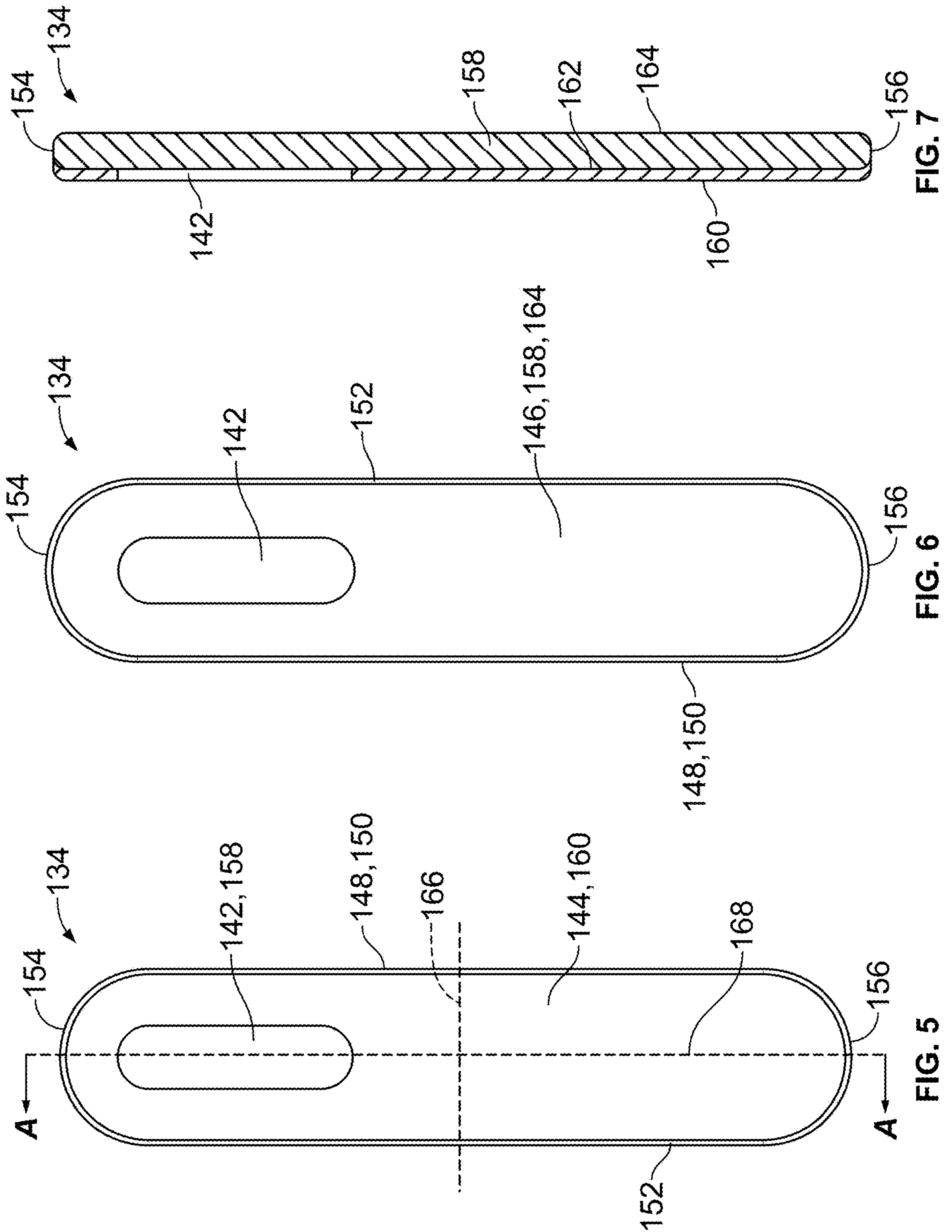
FIGS. 5 and 6 illustrate front and rear views, respectively, of an exemplary cover plate for the thumb turn assembly shown in FIG. 4.
FIG. 7 illustrates a cross sectional view of the exemplary cover plate taken along line A-A in FIG. 5.

FIGS. 5 and 6 illustrate front and rear views, respectively, of an exemplary cover plate 134 for the thumb turn assembly 126 shown in FIG. 4. As illustrated, the cover plate 134 can include a front side 144 and a rear side 146, and can have a shape that is generally defined by an outer periphery 148 that extends between the front and rear sides 144, 146 along a thickness of the cover plate 134. Further, in the illustrated embodiment, the outer periphery 148 can generally include a pair of opposing sidewalls 150, 152 that can define a width of the cover plate 134, and which can be adjoined by the first and second end walls 154, 156. At least a portion of the front side 144 of the cover plate 134 can include one or more windows 142 that is/are configured to accommodate a passage of a light transmitted directly or indirectly from an illumination source of, or for, the optical system 128 in a manner that can allow the transmitted light to be visible to the end user.

The one or more windows 142 of the cover plate 134 can be provided in a variety of different manners. For example, FIG. 7 illustrates a cross sectional view of the exemplary cover plate 134 taken along line A-A in FIG. 5. In this example, the cover plate 134 can comprise a base, or core, portion 158 and a front portion 160 that covers a portion of the base portion 158. Moreover, according to certain embodiments, the base portion 158 can comprise at least a translucent or transparent material, such as, for example, a generally clear colored or colorless glass, acrylic, or plastic material, among other materials. According to such an embodiment, at least a portion of the front portion 160 can be a generally opaque material that prevents transmission of light through the front portion 160. The front portion 160 can also be arranged to define the one or more windows 142 of the cover plate 134 that accommodate passage of transmitted light through the cover plate 134 in connection with providing illumination for the illumination user interface 130, and, moreover, illumination that is that is visible to the end user of the lockset 102 and/or the thumb turn assembly 126. For example, according to certain embodiments, the front portion 160 can be a printed, painted, or adhered material or substrate that is applied to a portion of the face surface 162, and/or a portion of the back surface 164, of the translucent or transparent base portion 158 in a manner that provides the cover plate 134 with a dead front. Moreover, the dead front provided by the front portion 160 can be applied to the face surface 162 of the base portion 158 in a manner that defines one or more windows 142 in which the front portion 160 is not present. Thus, in such an example, when viewed from the front of the thumb turn assembly 126, light transmitted by the optical system 128 can pass through the window 142, but generally not through the locations which the front portion 160 is present. However, the cover plate 134 can be constructed in a variety of manners, including, attaching a transparent or translucent window 142 in a through-hole or aperture of a generally opaque base portion 158, among other configurations.

Figure 16:
FIGS. 15 and 16 illustrate front views of alternative embodiments of the cover plate for the thumb turn assembly shown in FIG. 4.
Figure 15:
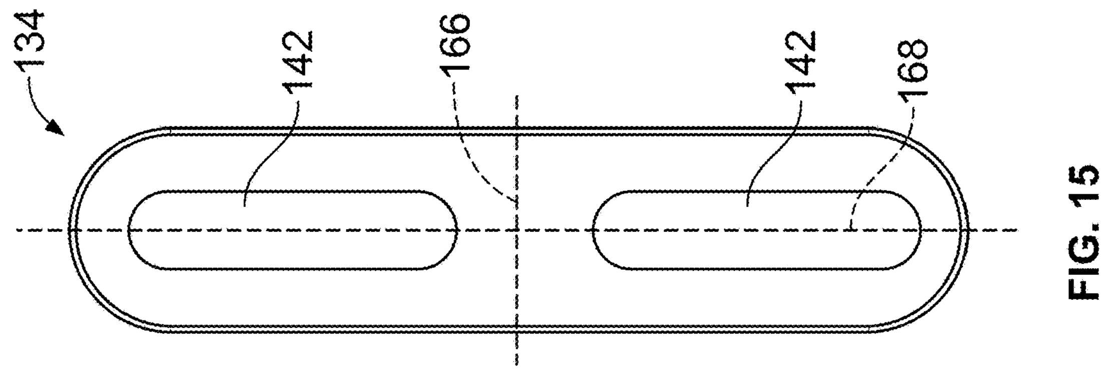

FIG. 5 illustrates an example in which the window 142 is provided with a generally oblong shape. Additionally, as shown in FIG. 5, the window 142 is a single window 142 that is positioned one side of a lateral centerline 166 of the cover plate 134, the lateral centerline 166 being generally orthogonal to a central longitudinal centerline 168 of the cover plate 134 (the longitudinal centerline 168 being shared with a portion of line A-A in this example). Thus, in this example, the window 142 is not centrally located, and, moreover is located on one, but not both, sides of the lateral centerline 166. Such a configuration can, for at least certain end users, assist in identifying the rotational orientation of the thumb turn 112, as generally illustrated in FIGS. 2 and 3. However, the window 142 can be positioned in a variety of locations, and can include a plurality of windows 142. For example, rather than being on one side of the lateral centerline 166, according to certain embodiments the window 142 can extend across the lateral centerline 166 in a manner that may result in the window 142 being symmetrical, or asymmetrical, about the lateral centerline 166 and/or the longitudinal centerline 168. Additionally, as seen in at least FIG. 15, according to other embodiments, the window 142 can be a pair of similar, or dissimilar, windows 142 that may or may not be equally distanced from the lateral centerline 166 and/or longitudinal centerline 168. FIG. 16 illustrates another example of a configuration of window 142 in which the window 142 has a generally oblong ring shape such that the front portion 160 is posited around the inner and outer portions of the ring-shaped window 142. However, as demonstrated herein, the window(s) 142 can have a variety of shapes, sizes, and/or configurations, as well as various combinations thereof.

Figures 8, 9:
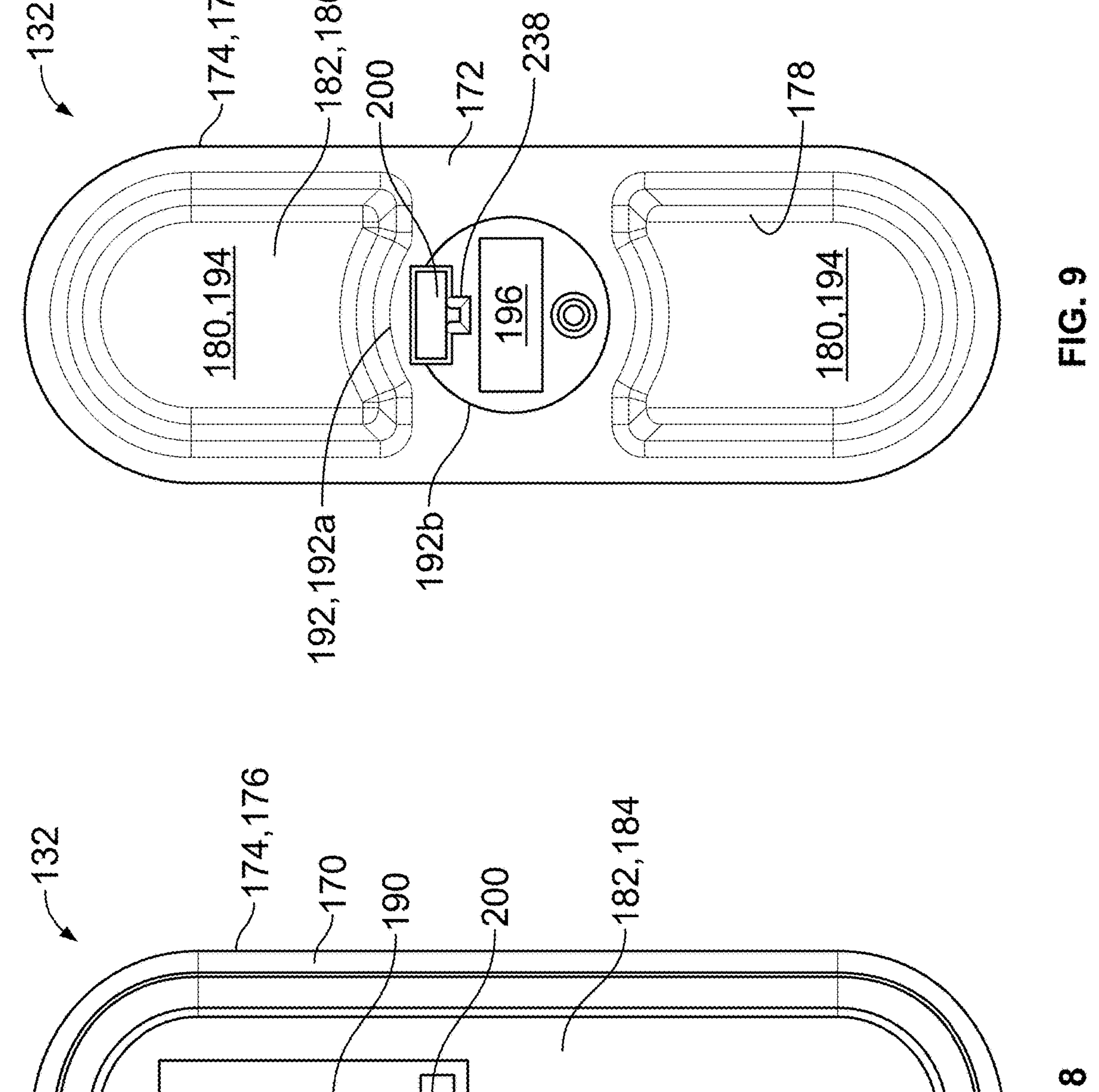
FIGS. 8 and 9 illustrate front and rear views, respectively, of an exemplary thumb turn body for the thumb turn assembly shown in FIG. 4.
Figure 10:
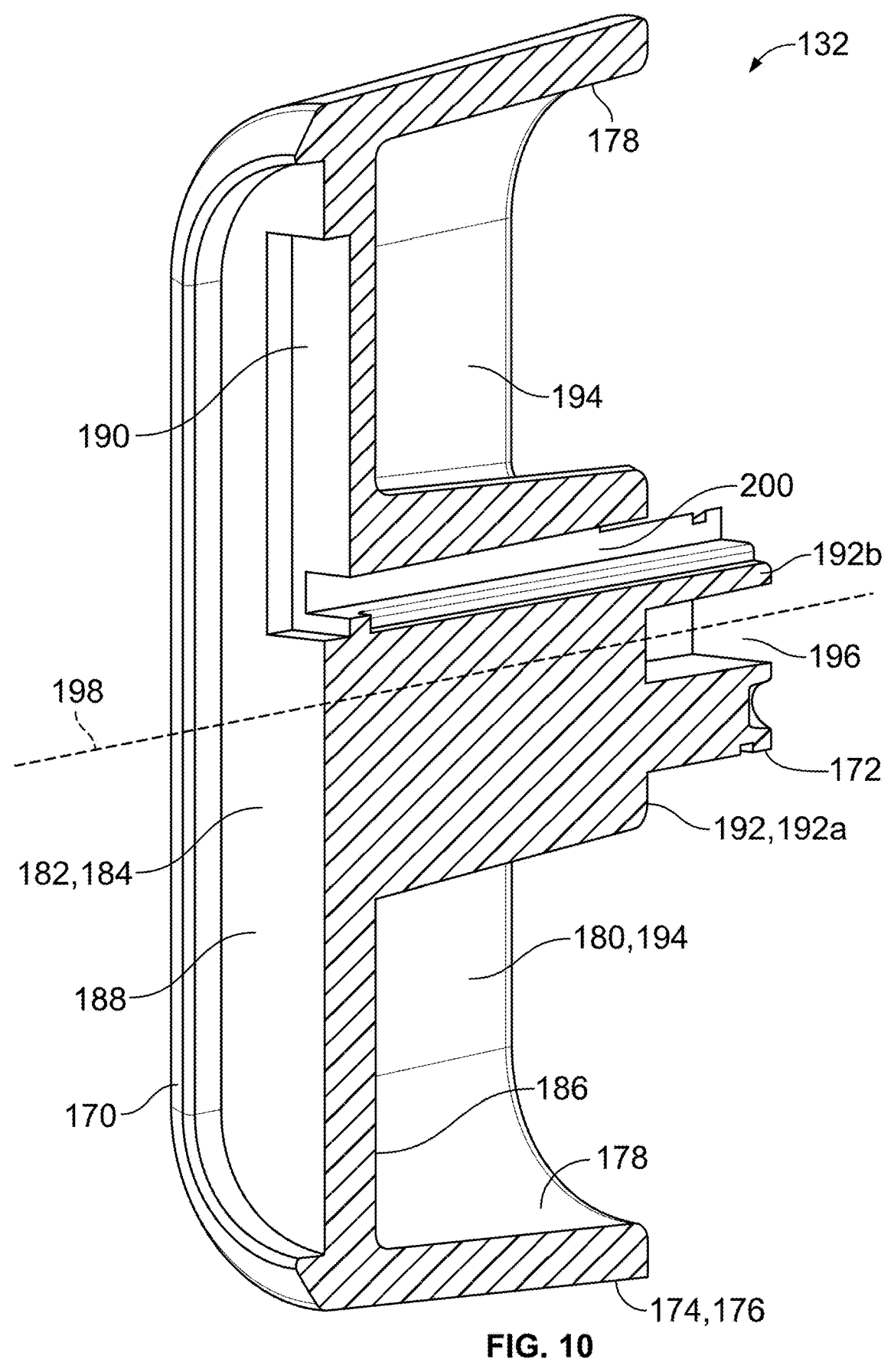

FIGS. 8 and 9 illustrate front and rear views, respectively, of an exemplary thumb turn body 132 for the thumb turn assembly 126 shown in FIG. 4. Further, FIG. 10 illustrates a perspective cross sectional view of the exemplary thumb turn body 132 taken along line B-B in FIG. 8. According to the illustrated embodiment, the thumb turn body 132 extends from a first end 170 to a second end 172 of the thumb turn body 132, and includes an outer body 174. The outer body 174 can include an outer surface 176 and an inner surface 178 that extends from a first side 180 to a second side 182 of the thumb turn body 132. The outer surface 176 can generally define at least a portion of an outer profile or shape of the thumb turn body 132, and is positioned to be engaged by one or more digits of an end user. While the outer surface 176 can be arranged in a variety of different configurations, according to the illustrated embodiment, the outer surface 176 can generally have an oblong or elongated oval shape, among other shapes and configurations.

The inner surface 178 of the outer body 174 can generally define an interior region 180 of the thumb turn body 132. A plate wall 182 can extend across at least portion of the interior region 180 and provide a backing surface to which the cover plate 134 can be secured, such as, for example, via the adhesive 136, to the thumb turn body 132. For example, according to certain embodiments, a front side 184 of the plate wall 182 can be inwardly offset from the first end 170 of the thumb turn body 132 such that the front side 184 of the plate wall 182 and a portion of the inner surface 178 of the outer body 174 generally define an orifice 188 that is sized to receive placement of the cover plate 134. The extent to which the plate wall 182 is offset from the first end 170 can be based on a variety of different criteria, including, for example, whether the cover plate 134 is to be generally flush with, inwardly recessed from, or protrude away from the first end 170 of the thumb turn body 132.

Figure 11:
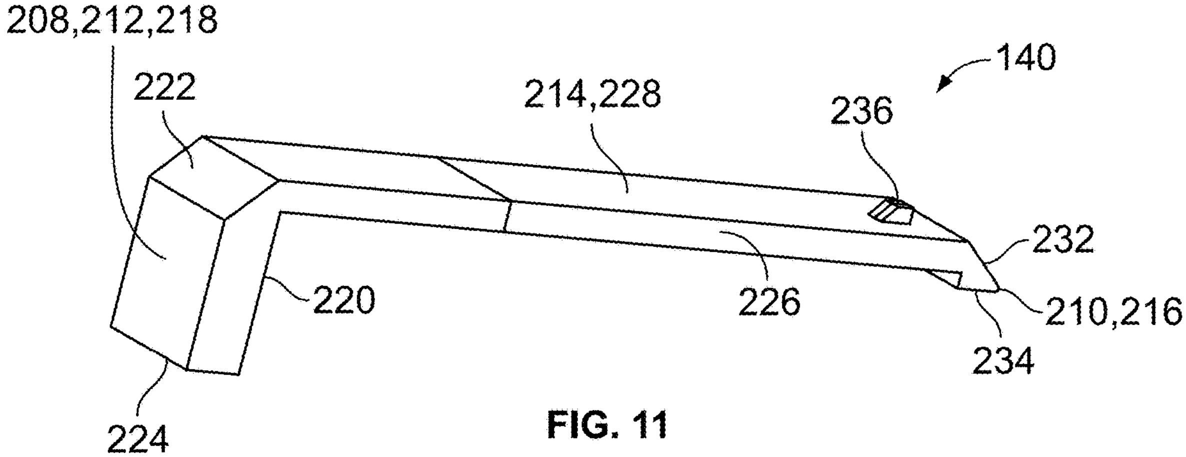
FIGS. 11 and 12 illustrate top and bottom first end perspective views, respectively, of an exemplary light pipe for the thumb turn assembly shown in FIG. 4.

As also seen in FIG. 11, the plate wall 182 can include one or more first apertures 190 that extend through the front side 184 of the plate wall 182, but do not necessarily extend through the back side 186 of the plate wall 182. Each first aperture 190 can be sized to receive placement of a light diffuser 138. Thus, for example, the first aperture 190 can have a size and/or shape that generally conforms to the corresponding size and/or shape of the light diffuser 138 that is to be received in the first aperture 190. Thus, according to embodiments in which the plate wall 182 includes a plurality of first apertures 190, the thumb turn assembly 126 can also include a plurality of associated light diffusers 138. Further, each light diffuser 138 can be secured within an associated first aperture 190 in a variety of different manners, including, for example, via a snap, press, or interference fit, or via use of a mechanical fastener or adhesive, among other manners of attachment. Further, the first aperture(s) 190 can be such that the light diffuser 138 is generally aligned with at least one window 142 of the cover plate 134 at least when the cover plate 134 is secured to the thumb turn body 132.

According to certain embodiments, the light diffuser 138 can have a size that is generally similar to, if not larger, than a corresponding window(s) 142 through which light transmitted through the light diffuser 138 is to be transmitted for viewing by the end user. Alternatively, the light diffuser 138 can have a size and/or configuration that is dissimilar to that of the corresponding window(s) 142, but which is sized so as to minimize or prevent areas in which light generated by the optical system 128 is not transmitted through the window 142. The light diffuser 138 can be constructed from a variety of materials that can assist with the scattering of light by the light diffuser 138, including, but not limited to, plastics, including acrylic plastics, among other materials.

Optionally, the thumb turn body 132 can include a hub portion 192 that may, or may not, be at least positioned within a portion of the interior region 180. According to the illustrated embodiment, the hub portion 192 includes a first hub portion **192*a* and a second hub portion 192*b*. The first hub portion 192*a* can extend from the back side 186 of the plate wall 182 to the second hub portion 192*b*, the second hub portion 192*b* extending to the second end 172 of the thumb turn body 132. The first hub portion 192*a* can have a length in a direction that is generally parallel to a central rotational axis 198 of the thumb turn body 132 such that the first hub portion 192*a* does not protrude out from the interior region 180 in a manner that could interfere with the thumb turn 112, and, moreover, a rear end of the outer body 174, being positioned adjacent to an escutcheon plate 204 (FIG. 13) of the trim assembly 110. Further, according to certain embodiments, the second hub portion 192*b* can have a size, such as, for example, a diameter, that can accommodate receipt of at least a portion of the second hub portion 192*b* in a hole or bore in at least the escutcheon plate 204. Thus, the second hub portion 192*b* can have a size, such as, for example, a diameter, that is smaller than a corresponding size, including diameter, of the first hub portion 192***a*. Further, as seen by the illustrated example shown in FIGS. 9-11, a portion, but not necessarily all, of the first hub portion 192*a* can be separated from the inner surface 178 of the outer body 174 by a gap 194, while other portions of the first hub portion 192*b* can be part of the outer body 174, including at locations at which the interior region 180 is not present. Additionally, according to certain embodiments, the hub portion 192 may include a second hub portion 192*b*, and not the first hub portion 192*a*, wherein the second hub portion 192*b* can, for example, extend from the outer body 174.

The hub portion 192, and, moreover, the second hub portion 192*b*, can be coupled to the drive shaft 124 such that displacement of the thumb turn 112, such as, for example, rotational displacement via engagement of the outer body 174 by an end user, can cause displacement of the drive shaft 132 in a manner that can transmit a force to displace the deadbolt 114 from the extended/locked position to the retracted/unlocked position, or vice versa. Additionally, or alternatively, the second hub portion 192*b* can be coupled to the drive shaft 124 such that displacement of the drive shaft 124 by an actuator 122, such as, for example a motor, can facilitate displacement of the thumb turn 112, such as for example, rotational displacement to the retracted/unlocked orientation (FIG. 2) or the extended/locked orientation (FIG. 3) for the thumb turn 112. The hub portion 192 can be coupled to the drive shaft 124 in a variety of manners. For example, according to certain embodiments, the second hub portion 192*b* can include a bore 196 at the second end 172 of the thumb turn body 132 that can receive insertion of at least a portion of the drive shaft 124. According to such embodiments, the second hub portion 192*b* can define the bore 196 so as to accommodate mating engagement of the drive shaft 132 with the bore 196. For example, according to certain embodiments, the bore 196 can have a generally rectangular cross-sectional shape that can accommodate the transmission of forces between one or more walls of the bore 196 and a mating generally rectangular cross-sectional shaped portion of the drive shaft 124 that is positioned within the bore 196. However, the second hub portion 192*b* and the drive shaft 124 can be coupled together in a variety of other manners and, including, for example, via use of one or more keys and/or pins, among other manners of coupling. Additionally, according to the illustrated embodiment, the bore 196 can be generally aligned with the central rotational axis 198 of the thumb turn body 132.

The thumb turn body 132 can further include a second aperture 200 that is positioned and configured for the transmission of light through at least a portion of the thumb turn body 132 and to the first aperture 190. For example, according to the illustrated embodiment, the second aperture 200 can generally extend from the second end 172 of the thumb turn body 132 and to the first aperture 190. Thus, according to such an embodiment, the second aperture 200 can extend through at least a portion of the hub portion 192. Further, as illustrated in FIG. 11, according to certain embodiments, the second aperture 200 can extend from the second end 172 to the first aperture 190 in a direction that is generally parallel to, and offset from, the central rotational axis 198. Additionally, in the illustrated embodiment, the second aperture 200 is sized and configured to house at least a portion of the light pipe 140. However, as discussed below with respect to FIG. 17, according to other embodiments, the second aperture 200 can be configured for passage of one or more wires 201 that can deliver, for example, electrical power, to an illumination source 202 that can be positioned on, or embedded within, the plate wall 182.

Figure 12:
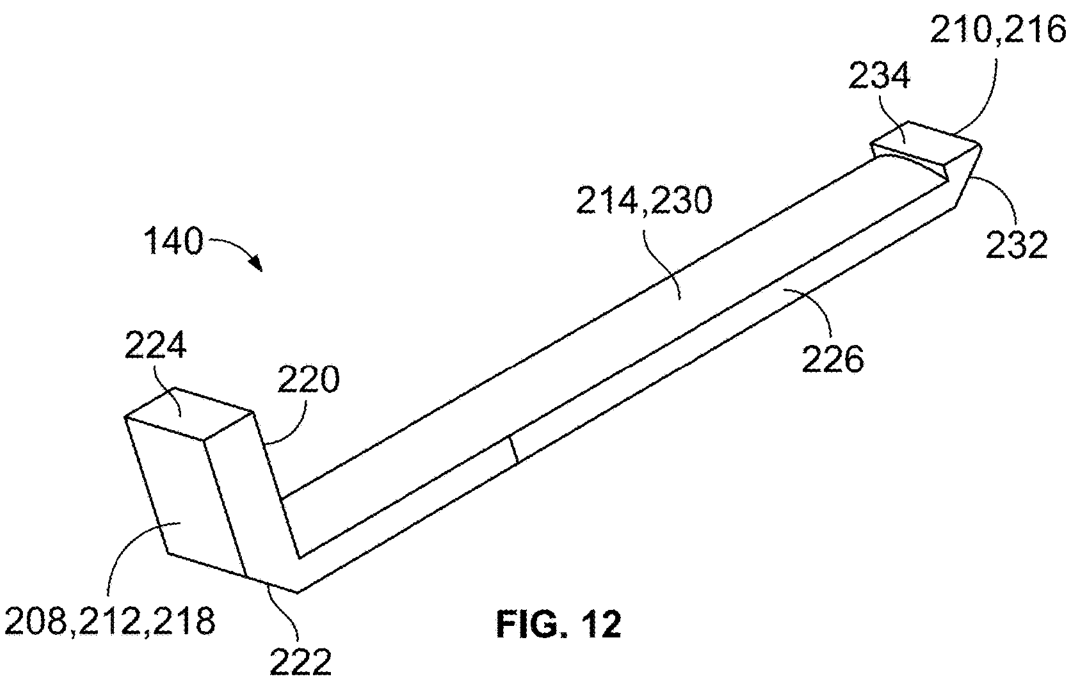

FIGS. 11 and 12 illustrate top and bottom first end perspective views, respectively, of an exemplary light pipe 140 for the thumb turn assembly 126 shown in FIG. 4. The light pipe 140 can be configured to at least direct, including redirect, light from one or more illumination devices or sources 206*a*, 206*b*, 206*c* (FIG. 14; collectively generally referred to herein as illumination source 206). Moreover, the light pipe 140 can be an optical-grade component that can assist in transmitting optical waves to a desired location, and, moreover, to the light diffuser 138. Additionally, or alternatively, the light pipe 140 can also be configured to diffuse or focus light from a light device 206. Thus, the light pipe 140 can be constructed from a variety of materials that can facilitate delivery of light, including, for example, an optical acrylic or polycarbonate material, among other materials.

The configuration of the light pipe 140 can be at least partially dependent on the locations of the light source 206 and the light diffuser 138. Moreover, the light pipe 140 can be configured such that a first end 208 of the light pipe 140 can be displaced with the displacement of the thumb turn body 132 to a position at which the first end 208 of the light pipe 140 is generally adjacent to an illumination source 206 that is to provide the light that will be transmitted through the window(s) 142 for illumination of the illumination user interface 130. Similarly, the light pipe 140 is also configured such that a second end 210 of the light pipe 140 is generally adjacent to the light diffuser 138 to which the light pipe 140 emits the light that has been transmitted through the light pipe 140.

In the illustrated example, the light pipe 140 includes a face portion 212 that generally extends from the first end 208 to a pipe portion 214 of the light pipe 140. Further, the pipe portion 214 of the light pipe 140 generally extends to a rear portion 216 of the pipe portion 214 located at the second end 210 of the light pipe 140. The face portion 212 can include a face wall 218 that is positioned to be adjacent to an illumination source 206, and an opposing rear wall 220. The face portion 212 can further extend between side walls 226 that may generally extend along the longitudinal length of the light pipe 140. The face portion 212 can further extend between a top wall 222 and a bottom wall 224. According to certain embodiments, the top wall 222 can be upwardly sloped from the face wall 218 toward an upper wall 228 of the pipe portion 214. Such a sloped configuration of the top wall 222 can assist the light pipe 140 in directing light that enters into the light pipe 140 through at least the face wall 218 to the pipe portion 214 of the light pipe 140. Moreover, as seen in at least FIG. 11, the pipe portion 214 can be linearly offset from the bottom wall 224 of the face portion 212 such that the rear wall 220 of the face portion 210 can provide a generally planar configuration that extends between at least a portion of the bottom wall 224 and the location at which the pipe portion 214 is adjoined to the face portion 212. According to such an embodiment, the top wall 222 can assist the light pipe 140 in direction light for transmission through the offset pipe portion 214.

The pipe portion 214 can include an upper wall 228 and an opposing lower wall 230, and can extend between the opposing side walls 226 of the light pipe 140. While the pipe portion 214 can have a variety of different shapes and configurations, according to the illustrated embodiment, the pipe portion 214 can have a generally rectangular or square cross-sectional shape. Further, according to certain embodiments, the pipe portion 214 can have a cross-sectional shape that is sized to be received in the mating second aperture 200 of the thumb turn body 132.

As seen in at least FIGS. 11 and 13, the pipe portion 214 can further include a protrusion 236 that outwardly extends from at least a portion of the pipe portion 214 in a direction that can engage, including abut, a corresponding tab 240 of the thumb turn body 132 that inwardly extends into the second aperture 200. The protrusion 236 and/or tab 240, including a combination thereof, can be configured to at least assist with the positioning of the light pipe 140 such that the front portion 212 of the light pipe 140 is adjacent to the light source 206 while the rear portion 216 of the light pipe 140 is positioned to transmit light to the light diffuser 138. According to certain embodiments, the second aperture 200 can include a recess 238 that is size to receive slidable insertion of the protrusion 236. Further, while the protrusion 236 is illustrated in at least FIG. 11 as outwardly extending from the upper wall 228 of the pipe portion 214, according to other embodiments, the protrusion 236 can outwardly extend from other portions of the pipe portion 214. For example, as indicated by the location of the recess 238 in FIG. 9, according to other embodiments the protrusion 236 can outwardly extend from the lower wall 230 of the pipe portion 214.

The rear portion 216 of the light pipe 140 can include a top wall 232 and an opposing bottom wall 234, and can extend between the sidewalls 226 of the light pipe 140. The top wall 232 can be configured to assist in directing light transmitted through the pipe portion 214 of the light pipe 140 to be emitted through the bottom wall 234 of the rear portion 216 and toward the light diffuser 138. Therefore, similar to the top wall 222 of the face portion 212, the top wall 232 of the rear portion 216 can be a sloped surface that generally upwardly slopes from the second end 210 toward the upper wall 228 of the pipe portion 214. According to the illustrated embodiment, the bottom wall 234 of the rear portion 216 can extend along a plane that is generally parallel to a plane at which the bottom wall 224 of the face portion 212 extends. Moreover, in the illustrated example, similar to the bottom wall 224 of the face portion 212, the bottom wall 234 of the rear portion 216 can extend in a direction that is generally parallel to the central rotation axis 198. Thus, according to the illustrated embodiment, when the thumb turn assembly 126 is assembled, the light diffuser 138 can be generally adjacent to the bottom wall 234 of the rear portion 216, as seen in FIG. 13.

Figure 14:
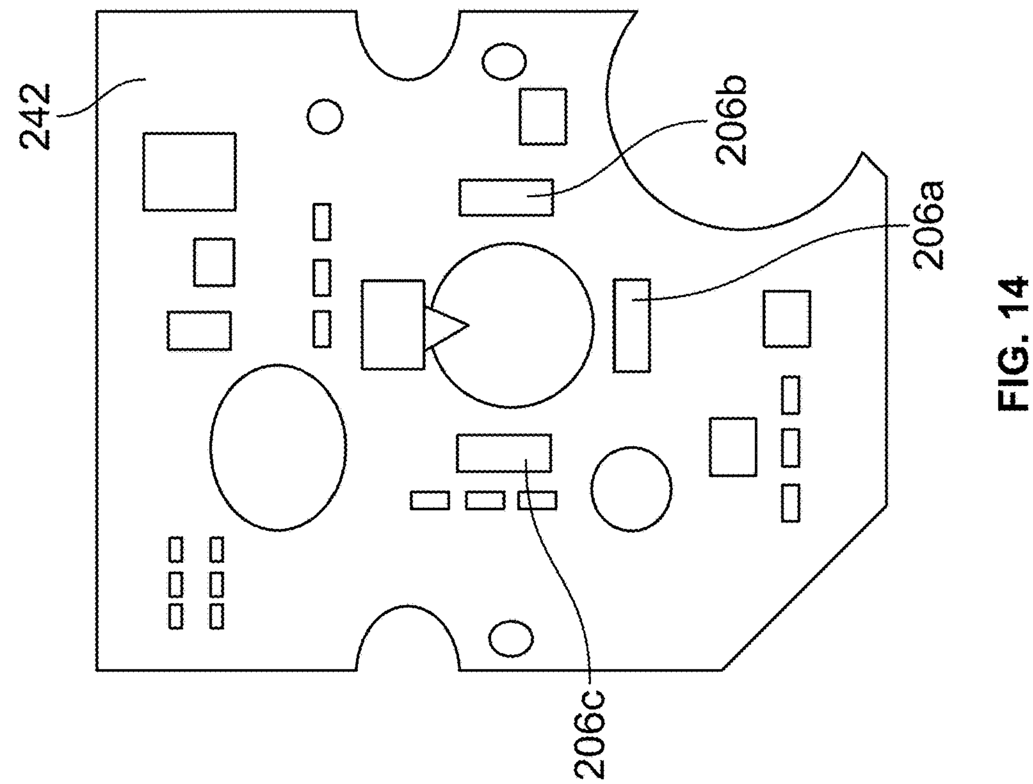
FIG. 14 illustrates a front view of an exemplary printed circuit board having a plurality of light sources for illumination of the illustrated thumb turn assembly.

FIG. 14 illustrates a front view of an exemplary printed circuit board (PCB) 242 having a plurality of light sources 206*a*, 206*b*, 206*c* (generally referred to has light source 206) of the optical system 128 that are configured to provide, including emit, a light for illumination of the illustrated thumb turn assembly 126 and/or the illumination user interface 130. A variety of different types of lights can be used as, or with, the light source 206, including, for example, light emitting diodes (LEDs). Additionally, each light source 206 can be configured to emit one or more lights or light colors, or can be operated to selectively change light colors for different circumstances, including for different active statuses (e.g., locked or unlocked statuses of the lockset 102 and/or deadbolt 114), or for an indication of the current orientation and/or current ability to operate the thumb turn 112. Further, according to certain embodiments, the light source 206 can be attached to, including soldered onto, the PCB 242.

According to the illustrated embodiment, at least one light source 206, such as, for example, a first light source 206*a*, can be positioned at a location that corresponds to the thumb turn 112 and/or thumb turn assembly 126 being at the unlocked, or retracted, orientation, as discussed above with respect to at least FIG. 2. Thus, in this example, the first light source 206*a* can be at a position in the PCB 242 such that, when the thumb turn 112 and/or thumb turn assembly 126 is at the unlocked, or retracted, orientation, the face wall 218 of the face portion 212 of the light pipe 140 is directly adjacent to, or across from, the first light source 206*a*. Accordingly, in this example, with the face wall 218 of the face portion 212 of the light pipe 140 adjacent to, or across from, the first light source 206*a*, light provided by the operation of the first light source 206*a* can enter into the light pipe 140 through the face wall 218, and be transmitted through the light pipe 140 to the light diffuser 138, wherein the light can be emitted through the window(s) 142, as discussed above.

In such an example wherein the first illumination source 206*a* is located at a position about the PCB 242 that corresponds to the thumb turn 112 and/or deadbolt 114 being at a unlocked orientation or position, respectively, the light transmission through the window(s) 142 can have a first color, such as, for example, a white or green color, or combination thereof. Visibility of such a first color, and/or the associated orientation of the illuminated shape provided by the window(s) 142, can allow the illumination user interface 130 to provide an end user with an illuminated visual indication of the lockset 102 having a first active status (e.g. unlocked/retracted) with minimal, if any, interference being created by the current ambient light levels or conditions.

The light source 206 can also include one or more second light sources 206*b*, 206*c* that can be positioned at a location(s) that will be adjacent to the face portion 212 of the light pipe 140 when the thumb turn 112 and/or thumb turn assembly 126 is at the locked, or extended orientation, as discussed above with respect to at least FIG. 3. For example, with respect to the embodiment shown in FIG. 3, the handing of at lockset 102 can result in the deadbolt 114 being displaced, with respect to the orientation of the view shown in FIG. 3, to the left when the deadbolt 114 is extended to the locked position. With such handing, the exemplary thumb turn assembly 126 rotates in the second direction ("$r_2$" in FIG. 3). Thus, with such handing of the lockset 102, a second light source 206*b* can be at a location about the PCB 242 such that, as the light pipe 140 is displaced with the displacement with at least the thumb turn 112 to the second, locked orientation, the face wall 218 of the light pipe 140 is positioned adjacent to, or across from, the second light source 206*b*. With the face wall 218 adjacent to, or across from, the second light source 206*b*, light emitted by the second light source 206*b* can enter into the light pipe 140 through the face wall 218, and be transmitted through the light pipe 140 to the light diffuser 138 for transmission through the window(s) 142, as discussed above.

While FIG. 3 illustrates the thumb turn 112 and/or thumb turn assembly 126 at a second, locked orientation for a first handing of the lockset 102, in other applications the locket 102 can be configured for an opposite, or second handing. For instance, in the illustrated example, rather than extending from a free edge 106 located on the left side of the door 104, in other applications, the lockset 102 can be configured to extend from a free edge on a right side (not shown) of the door 104. Thus, in such an example, rather than the thumb turn 112 being rotated in the counterclockwise direction ("$r_2$") to the locked orientation, the thumb turn 112' (as shown in broken line format in FIG. 3) can instead be rotated in the clockwise direction ("$r_1$"). In such an example, when thumb turn 112', and thus the thumb turn assembly 126, is rotated to the locked orientation, the face portion 212 of the light pipe 140 can be moved to a position at which the face portion 212 of the light pipe 140 is adjacent to another second light source 206*c* (FIG. 14).

Accordingly, the optical system 128 can include at least a pair of second light sources 206*b*, 206*a*, one second light source 206*b* positioned for a first handing of the lockset 102, as discussed above, and another second light source 206*c* positioned for another, or second, handing of the lockset 102, as represented by the thumb turn 112' shown in broken line format in FIG. 3. Thus, with respect to the illustrated example, each light source 206*b*, 206*c* of the pair of second light sources 206*b*, 206*c* can be on an opposite side of the first light source 206*a*, such that, regardless of the handing set for the lockset 102, and the associated direction the thumb turn 112, 112' is rotated, the face portion 212 of the light pipe 140 will be adjacent to at least one second light source 206*b*, 206*c* when the thumb turn 112, 112' and/or thumb turn assembly 126 is at the locked, or extended orientation.

In such an example wherein at least some of the second illumination sources 206*b*, 206*c* are located at positions about the PCB 242 that correspond to the thumb turn 112 and/or deadbolt 114 being at the locked, or extended orientation or position, respectively, a second illumination source 206*b*, 206*c* can provide a second color for transmission through the window(s) 142, such as, for example, a red color. Visibility of such a second color, and/or the associated orientation of the illuminated shape provided by the window(s) 142, can allow the illumination user interface 130 to provide an illuminated visual indication of the lockset 102 having a second active status (e.g. locked/extended) to the end user, again with minimal, if any, interference being created by the current ambient light levels or conditions. Further, in addition to, or in lieu of, use of one or both first and second colors to provide illuminated visual indications of the active status of the lockset 102, at least one of the first illumination source 206*a* and the second illumination source 206*b*, 206*c* can be selectively operated in illumination/non-illumination patterns (or on/off sequences) that can also further visually distinguish between the first and second active statuses of the lockset 102, and thus the corresponding orientation of the thumb turn 112.

FIG. 18 illustrates a block diagram of a simplified representation of a system 300 that includes a trim assembly 110 having a lockset 102 that includes a thumb turn assembly 126 that includes an optical system 128 that can be selectively illuminated via at least settings and/or commands communicated by a computing device 302 to the trim assembly 110, or otherwise retrieved by the trim assembly 110. A variety of different types of mobile or non-mobile devices can be utilized as the computing device 302, including, for example, smart phones, laptops, desktop computers, and mobile phones, among other mobile or non-mobile communication devices, among other computing devices.

As seen in FIG. 18, either or both the trim assembly 110 and the computing device 302 can include a controller 244, 304, respectively. Each controller 244, 304 can include at least one processor 246, 306 and at least one memory device 248, 308. One or more, if not all, of the controllers 244, 304, processor(s) 246, 306, and/or memory device(s) 248, 308 may, or may not, be dedicated to the operation of the system 300. The processor 246, 306 can comprise one or more processors, including compute circuits, that can be utilized to control operation of the associated component of the system 300, and, optionally, can also be utilized in connection with controlling one or more other operations or components of the system 300. Therefore, according to certain embodiments, one controller 244, 304, including one or more processors 246, 306 of that controller 244, 304, can be utilized to control operation of at least the trim assembly 110 and/or lockset 102, or the corresponding components, portions, or segments of the trim assembly 110 and/or lockset 102. Alternatively, a plurality of controllers 244, 304, or combinations of processors 246, 306, including compute circuits, can be utilized to control operation of the trim assembly 110 and/or lockset 102, as well as control operations of different components or systems of the system 300, including the access control management system 126. Thus, for example, while certain embodiments herein may mention functions being performed by a controller 244, 304, including the associated processor 246, 306, such functions can be performed by a single controller or processor, or, alternatively, one or more functions can be performed by one or more controllers or processors, and one or more other functions can be performed by one or more other controllers or processors or combinations of controllers or processors.

The memory device 248, 308 can have instructions stored therein that are executable by the processor 246, 306 to cause the processor 246, 306 to perform a corresponding action. The processor 246, 306 can be embodied as, or otherwise include any type of processor, controller, or other compute circuit capable of performing various tasks of at least the associated component of the system 300. For example, the processor 246, 306 can be embodied as a single or multi-core processor(s), a microcontroller, or other processor or processing/controlling circuit. In some embodiments, the processor 246, 306 can be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 246, 306 can be embodied as, or otherwise include a high-power processor, an accelerator co-processor, or a storage controller.

The memory device 248, 308 can be embodied as any type of volatile (e.g., dynamic random-access memory (DRAM), etc.) or non-volatile memory capable of storing data therein. Volatile memory may be embodied as a storage medium that requires power to maintain the state of data stored by the medium. Non-limiting examples of volatile memory may include various types of random-access memory (RAM), such as dynamic random-access memory (DRAM) or static random-access memory (SRAM). One particular type of DRAM that may be used in a memory module is synchronous dynamic random-access memory (SDRAM).

In some embodiments, the memory device 248, 308 can be embodied as a block addressable memory, such as those based on NAND or NOR technologies. The memory device 248, 308 can also include future generation nonvolatile devices, such as a three-dimensional crosspoint memory device (e.g., Intel 3D XPoint™ memory), or other byte addressable write-in-place nonvolatile memory devices. In some embodiments, the memory device 248, 308 can be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device 248, 308 can refer to the die itself and/or to a packaged memory product. In some embodiments, 3D crosspoint memory (e.g., Intel 3D XPoint™ memory) can comprise a transistor-less stackable cross point architecture in which memory cells sit at the intersection of word lines and bit lines and are individually addressable and in which bit storage is based on a change in bulk resistance.

As also shown in FIG. 18, either or both the trim assembly 110 and the computing device 302 can include communication unit 250, 310, respectively, that can accommodate the communication of information to/from each other, as well as other components of the system 300. The communication units 250, 310 can be configured for either, or both, wired or wireless communications, including, for example, via proprietary and non-proprietary wireless communication protocols. For example, the communication units 250, 310 can be configured to accommodate Wi-Fi, ZigBee, Bluetooth, radio, cellular, or near-field communications, among other communications that use other communication protocols, including, but not limited to, communications over a wireless network 290, such as, for example internet, cellular, or Wi-Fi networks, as well as combinations thereof. According to certain embodiments, the communication units 250, 310 can comprise a transceiver.

The computing device 302 can also include an input/output (I/O) device 312, including, but not limited to, a keyboard, keypad, touch screen, monitor, display, mouse, button, or joystick, among others. The I/O device 312 can be utilized at least in connection with an end user selecting settings for the operation of the thumb turn assembly 126 and/or operation of the optical system 128 and illumination user interface 130. For example, according to certain embodiments, the I/O device 312 can be utilized to select times or periods in which power from a power source 252 is to provide electrical power to illuminate one or more, if not all, of the immunization sources 206. The power source 252, including, for example, a battery or power provided from a utility source, can be utilized to provide power for a variety of other components of the trim assembly 110, including, but not limited to, the actuator 122, controller 244, communication unit 205, sensor 252, and/or another illumination source 202, among other components. While FIG. 18 illustrates the computing device 302 as having an I/O device 312, additionally, or alternatively, such an I/O device, or a similar I/O device, can be included as part of the trim assembly 110, or otherwise communicatively coupled to the trim assembly 110.

The trim assembly 110 can also include at least one sensor 252 that can be utilized to detected at least certain ambient conditions. For example, according to certain embodiments, the sensor 252 can be a light sensor, including, but not limited to, a lux sensor, photoresistor, photodiode, phototransistor, and/or photovoltaic cell, among other light sensors. Additionally, or alternatively, the sensor 252 can be a motion sensor, proximity sensor, or vibration sensor that can provide information indicative of the presence of an end user(s), or a potential end user(s), within a certain distance or area of the trim assembly 110.

According to certain embodiments, a supply of power from the power source 252 for illumination of one or more of the illumination sources 202, 206 can be triggered by information provided by one or more of the sensors 252. For example, as discussed above, according to certain embodiments, the sensor 252 can be configured to detect be presence, absence, and or level of ambient light at or around the trim assembly 110, but not limited to, in a room or area at which the trim assembly 110 is located. The memory device 248 can include one or more instructions that indicate a light level threshold that may be indicative of if, or when, the controller 244, including the processor 246, of the trim assembly 110 is to generate one or more signals to facilitate a supply of power from the power source 252 for illumination of an illumination source(s) 202, 206, and thereby turn the illumination source(s) 202, 206 to an on state. According to certain embodiments, the light level threshold may be a predetermined value, including, a factory preset value, and or maybe adjustable by an end user, including, for example, and end user inputting instructions by use of the I/O device 312 of the computing device 302 that are communicated via the communication units 250, 302 to the controller 244 of the trim assembly 110. Additionally, or alternatively, according to certain embodiments, such settings can be inputted directly by the end user to the trim assembly 110.

A failure to satisfy the light level threshold, including, for example, when ambient light levels are below the light level threshold can thus be utilized to trigger the illumination of the illumination source(s) 202, 206. Thus, for example, an end user may set the light level threshold to correspond to light levels that are typically experienced at dusk, and moreover, light levels associated with the darkest stage of twilight, among other ambient light levels. Conversely, upon ambient light levels satisfying the light level threshold, such as, for example, light levels meeting or exceeding the light level threshold, as detected by use of information provided by the sensor 252, the controller 244, including the processor 246, of the trim assembly 110 can be triggered to generate one or more signals to cease the supply of power from the power source 252 for illumination of the illumination source(s) 202, 206, which can thereby turn the illumination source(s) 202, 206 to an off state.

Additionally, or alternatively, the sensor 252, including, for example, a motion and/or proximity sensor, can provide information for the controller 244 that can be indicative of whether one or more actual or potential end users of the trim assembly 110 are at positions or locations at which such end users may use the trim assembly 110. Thus, for example, during periods of time at which the sensor 252 may indicate a lack of a presence or motion of an actual or potential end user, the controller 244, including the processor 246, may be utilized to either turn the illumination source(s) 202, 206 to the off state, or maintain the illumination source(s) 202, 206 in the off state. However, in response to information provided by the sensor(s) 252 indicating an actual or potential presence of an end user, the controller 244, including the processor 246, can generate one or more signals that can facilitate a supply of power from the power source 252 to the illumination source(s) 202, 206 in a manner that can illuminate the illumination source(s) 202, 206, and moreover, turn the illumination source(s) 202, 206 to an on state. The extent of motion that is to be detected by the sensor 252, and/or the proximity at which the end user(s) is to be to the trim assembly 110, to trigger the controller 244, including the processor 246, to generate one or more signals to turn the illumination source(s) 202, 206 to the on state can, according to certain embodiments, be set by the end user via use of the computing device 302, wherein those inputted settings can be directly or indirectly communicated from the computing device 302 to the trim assembly 110. Additionally, or alternatively, according to certain embodiments, such settings can be inputted directly by the end user to, including at, the trim assembly 110.

Additionally, or alternatively, according to certain embodiments, an end user can set a schedule for the time(s) or periods at which the illumination source(s) 202, 206 are, or are not, to be illuminated, and, moreover, periods of time when power is to be provided from the power source 252 for illuminating the illumination source(s) 202, 206. Again, as with other settings, such scheduling of the illumination of the illumination source(s) 202, 206 can be set by the user inputting such schedule information into the computing device 302 via use of the I/O device 312, and such settings being communicated to the trim assembly 110, and/or such information being inputted at the trim assembly 110. For example, according to certain embodiments, an end user can set the time at which the illumination source(s) 202, 206 is to be illuminated to coincide with certain conditions, including, for example, a combination of relatively low ambient light levels for time periods at which end users are anticipated to at least potentially use the trim assembly 110. Thus, according to such embodiments, although ambient light levels may be anticipated to be relatively low during evening hours, end users may be anticipated to potentially use the trim assembly 110 during only a portion of those evening hours. Accordingly, the end user may select to cease a supply of power from the power source 252 to the illumination source(s) 202, 206 during evening hours when potential users are anticipated to not be utilizing the trim assembly 110 in at least an attempt to conserve at least some of the power of the power source 252.

The system 300 can also be configured to set which one of the second illumination sources 206*b*, 206*c* is to be illuminated. For example, as discussed above, the thumb turn 112, 112' can be configured for different handing of the trim assembly 110 and/or lockset 102. Thus, as generally indicated by the thumb turns 112, 112' shown in FIG. 3, and the associated illumination sources 206*b*, 206*c* shown in FIG. 14, the selected handing can determine which of the second illumination sources 206*b*, 206*c* will, or will not, at least occasionally be adjacent to the face portion 212 of the light pipe 140. Moreover, based on the selected handing, one of the second illumination sources 206*b*, 206*c* may not be utilized. Accordingly, in at least an attempt to conserve electrical power of the power source 252, one of the second illumination sources 206*b*, 206*c* associated with the unused handing can be set in a deactivated state while the other second illumination source 206*b*, 206*c* that will be used to emit light that is transmitted through the thumb turn assembly 126 can be set to at least occasionally be placed in an activated state. Thus, when set at the deactivated state, regardless of the orientation or positioning of the thumb turn 112, 112', electrical power is not supplied to the deactivated second illumination source 206*b*, 206*c*. Which of the second illumination sources 206*b*, 206*c* is in the deactivated state, or the activated state, can subsequently be changed by changes in settings by the end user.

The computing device 302 and or the trim assembly 110 can also be configured to receive user settings with respect to the color, or colors, that is/are to be emitted from one or more of the illumination source(s) 202, 206. For example, an end user may provide inputted settings, including via use of the computing device 302, that indicate whether, or what, different light colors are to be utilized for different active statuses of the lockset 102, and, moreover, for different thumb turn 112 and/or deadbolt 114 orientations or positions, respectively. Similarly, an end user can also input one or more illumination patterns, including patterns or repeated changes in the on/off state of one or more of the illumination source(s) 202, 206. According to certain embodiments, such settings by the end user can include use of an illumination pattern with one, but not all, of such active statuses, or, alternatively, different illumination patterns for different active statuses of the lockset 102, and, moreover, for different thumb turn 112 and/or deadbolt 114 orientations or positions, respectively.

Figure 17:
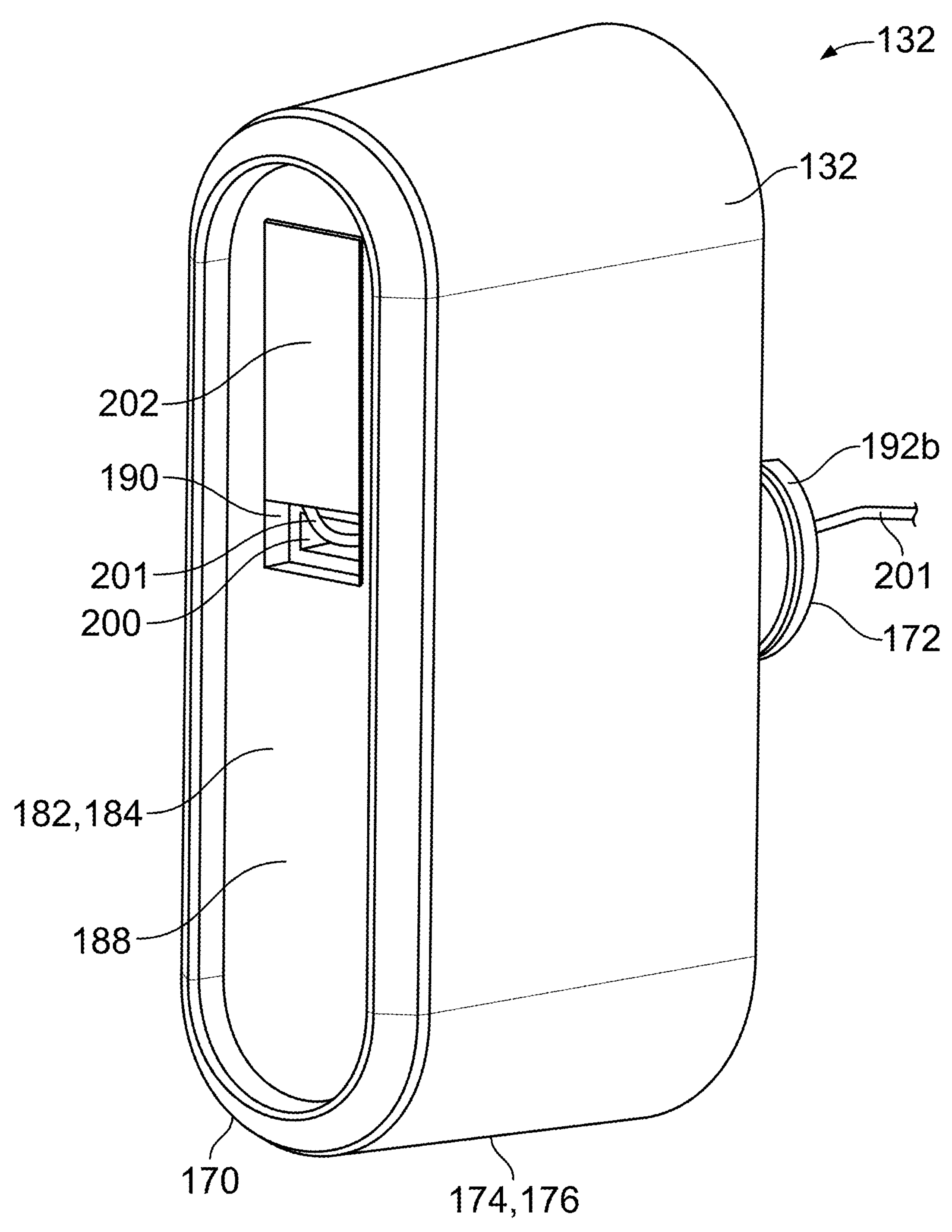
FIG. 17 illustrates a front perspective view of an alternative embodiment of a thumb turn assembly with the cover plate removed.

FIG. 17 illustrates a front perspective view of an alternative embodiment of a thumb turn assembly 126' in which, for purposes of explanation, the cover plate 134 is at least temporarily removed. The illustrated thumb turn assembly 126' is generally similar to the thumb turn assembly 126 discussed above, except the thumb turn assembly 126' includes an illumination source 202, such as, for example an LED, positioned in the first aperture 190. Thus, unlike the above-discussed thumb turn assembly 126, the illustrated thumb turn assembly 126' shown in FIG. 17 may not include the light pipe 140 or light diffuser 138. Instead, the second aperture 200 can provide a passageway for one or more wires 201 to deliver electrical power to the one or more illumination sources 206. The cover plate 138, which may be optional, can again be configured and positioned such that light emitted from the illumination source(s) 206 is again transmitted through the window(s) 142, as previously discussed.

According to certain embodiments, the illumination source 202 utilized with the thumb turn assembly 126' shown in FIG. 17 can be configured to emit different colored lights. For example, the illumination source 202 can emit a light having a first color when the thumb turn 112 is that the first, or unlocked, orientation, and emit light having a second color when the thumb turn 112 is at the second, locked, orientation, the first color being different than the second color. Optionally, according to such embodiments, the sensor 252, including, for example, a rotary position sensor, can be configured to detect an orientation or position of the thumb turn 112 or other component of the thumb turn assembly 126' or lockset 102, including the deadbolt 114, in a manner that can provide an indication of whether the thumb turn 112 is in the first or second orientation. According to such an embodiment, the orientation or position information provided by the sensor 252 can be used by the controller 244, including, for example, the processor 246, in connection with determining whether the illumination source 202 should be emitting light, if any, having the first color or the second color.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A thumb turn assembly for a trim assembly having a lockset, the thumb turn assembly comprising:

a thumb turn body configured for a displacement between a first orientation and a second orientation, the first orientation associated with a bolt of the lockset being in an unlocked position, the second orientation associated with the bolt being in a locked position; and an optical system coupled to the thumb turn body, at least a portion of the optical system being displaced with the displacement of the thumb turn body, the optical system including at least one electrically-powered light source configured to transmit an illumination from or through the thumb turn body to visually communicate an illuminated indication of at least the thumb turn body being in at least one of the first orientation and the second orientation.

2. A thumb turn assembly for a trim assembly having a lockset, the thumb turn assembly comprising:

a thumb turn body configured for a displacement between a first orientation and a second orientation, the first orientation associated with a bolt of the lockset being in an unlocked position, the second orientation associated with the bolt being in a locked position; and an optical system coupled to the thumb turn body, at least a portion of the optical system being displaced with the displacement of the thumb turn body, the optical system configured to transmit an illumination from or through the thumb turn body to visually communicate an illuminated indication of at least the thumb turn body being in at least one of the first orientation and the second orientation; and wherein the optical system comprises a light pipe and a light diffuser, the light pipe positioned to transmit at least a portion of the illumination from an illumination source to the light diffuser.

3. The thumb turn assembly of claim 2, wherein the thumb turn body includes a first aperture and a second aperture, the first aperture configured for placement of the light diffuser, the second aperture configured to receive placement of at least a portion of the light pipe.

4. The thumb turn assembly of claim 3, further including a cover plate secured to the thumb turn body, the cover plate having at least one window positioned adjacent to the light diffuser.

5. The thumb turn assembly of claim 1, wherein the optical system includes a first light source and a second light source, the first light source positioned to emit a first light for transmission through the thumb turn body when the thumb turn assembly is at the first orientation, the second light source positioned to emit a second light for transmission through the thumb turn body when the thumb turn assembly is at the second orientation.

6. The thumb turn assembly of claim 5, wherein the second light source comprises a pair of second light sources, each light of the pair of second light sources positioned for a different handing of the trim assembly.

7. The thumb turn assembly of claim 1, further including an illumination source coupled to the thumb turn body, the illumination source being displaced with the displacement of the thumb turn body between the first and second orientations.

8. The thumb turn assembly of claim 7, wherein the thumb turn body includes a first aperture and a second aperture, at least a portion of the illumination source being positioned in the first aperture, the second aperture configured for passage of one or more wires that deliver electrical power for the illumination source.

9. An assembly, comprising:

a lockset having a bolt that is displaceable between a locked position and an unlocked position;

a thumb turn body coupled to the bolt, the thumb turn body being at a first orientation when the bolt is at the unlocked position, the thumb turn body being at a second orientation when the bolt is at the locked position, the first orientation being different than the second orientation; and an optical system coupled to the thumb turn body, the optical system including a light diffuser and a light pipe, the light diffuser and the light pipe being coupled to, and rotatably displaceable with the thumb turn body, the optical system configured to transmit an illumination that visually indicates the thumb turn body being in at least one of the first orientation and the second orientation.

10. The assembly of claim 9, further including a cover plate secured to the thumb turn body, the cover plate having at least one window positioned adjacent to the light diffuser, the cover plate configured to provide a dead front.

11. The assembly of claim 9, wherein the thumb turn body includes a first aperture and a second aperture, the first aperture configured for placement of the light diffuser, the second aperture configured to receive placement of at least a portion of the light pipe.

12. The assembly of claim 9, wherein the optical system includes a first light source and a second light source, the first light source positioned to emit a first light for transmission through the thumb turn body when the thumb turn assembly is at the first orientation, the second light source positioned to emit a second light for transmission through the thumb turn body when the thumb turn assembly is at the second orientation.

13. The assembly of claim 12, wherein the second light source comprises a pair of second light sources, each light of the pair of second light sources positioned for a different handing of the lockset.

14. The assembly of claim 12, wherein the first light source and the second light source are each a light emitting diode positioned on a printed circuit board.

15. A system for providing a visual indication of a bolt of a lockset being in either an unlocked position or a locked position, the system comprising:

a thumb turn assembly comprising a thumb turn and an optical system;

the thumb turn being displaceable between a first orientation and a second orientation, the first orientation indicative of the bolt being in the unlocked position, the second orientation indicative of the bolt being in the locked position;

the optical system coupled to the thumb turn assembly with at least a portion of the optical system displaceable with displacement of the thumb turn between the first orientation and the second orientation, the optical system comprising at least one illumination source, the thumb turn assembly configured for a transmission of a light emitted by the illumination source from or through the thumb turn in a manner that visually distinguishes: (a) the thumb turn being in the first orientation from being in the second orientation, and/or (b) the thumb turn being in the second orientation from being in the first orientation;

at least one processor; and a memory coupled with the processor, the memory including instructions that when executed by the processor cause the processor to:

generate one or more signals to facilitate an activation of at least a portion the at least one illumination source; and generate one or more signals to facilitate a deactivation of at least the portion of the at least one illumination source.

16. The system of claim 15, further including a sensor, wherein the memory includes instructions that when executed by the processor cause the processor to generate one or more signals to facilitate either, or both, the activation and the deactivation of at least the portion of the at least one illumination source in response to information provided by the sensor.

17. The system of claim 16, wherein the memory further includes instructions that when executed by the processor cause the processor to compare information obtained from the sensor with a preset light level threshold to determine whether to generate one or more signals for the activation or the deactivation of at least the portion of the at least one illumination source.

18. The system of claim 15, wherein the memory includes instructions that when executed by the processor cause the processor to generate one or more signals to facilitate either, or both, the activation and the deactivation of at least the portion of the at least one illumination source in response to a set schedule.

19. The system of claim 15, wherein the activation of at least the portion of the at least one illumination source comprises emission of a first light having a first color, but not emission of a second light having a second color, and wherein the deactivation comprises an emission of the second light having the second color, but not emission of the first light having the first color, the first color being different than the second color.

20. The system of claim 15, wherein the at least one illumination source comprises at least a first illumination source and a second illumination source, and wherein the memory includes instructions that when executed by the processor cause the processor to generate one or more signals for only one of the first illumination source and the second illumination source to be activated when the thumb turn is at the first orientation, and to generate one or more signals for only one of the other of the first illumination source and the second illumination source to be activated when the thumb turn is at the second orientation.

21. The thumb turn assembly of claim 1, wherein the optical system is structurally coupled to the thumb turn body such that at least a structural portion of the optical system is displaced with the displacement of the thumb turn body.

22. The system of claim 15, wherein the optical system is structurally coupled to the thumb turn assembly such that at least a structural portion of the optical system is displaced with the displacement of the thumb turn.

* * * * *